(12) United States Patent
Niiyama et al.

(10) Patent No.: US 12,086,924 B2
(45) Date of Patent: Sep. 10, 2024

(54) TERMINAL DEVICE, METHOD, AND COMPUTER PROGRAM

(71) Applicant: JVCKENWOOD Corporation, Yokohama (JP)

(72) Inventors: Mahoko Niiyama, Yokohama (JP); Tomoaki Ogata, Yokohama (JP); Jun Oki, Yokohama (JP); Kazuya Tanabe, Yokohama (JP); Kaoru Toyoguchi, Yokohama (JP); Tomohide Inomata, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

(21) Appl. No.: 18/172,357

(22) Filed: Feb. 22, 2023

(65) Prior Publication Data

US 2023/0206546 A1    Jun. 29, 2023

Related U.S. Application Data

(63) Continuation of application No. PCT/JP2020/047829, filed on Dec. 22, 2020.

(30) Foreign Application Priority Data

Aug. 31, 2020  (JP) ................. 2020-146358

(51) Int. Cl.
*G06F 3/01*    (2006.01)
*G06T 7/73*    (2017.01)
*G06T 15/20*   (2011.01)

(52) U.S. Cl.
CPC .............. *G06T 15/20* (2013.01); *G06F 3/011* (2013.01); *G06T 7/73* (2017.01); *G06T 2207/10016* (2013.01); *G06T 2207/30204* (2013.01)

(58) Field of Classification Search
CPC ............ G06F 3/011; G06T 7/73; G06T 15/20
(Continued)

(56) References Cited

U.S. PATENT DOCUMENTS 11,348,326 B2 *  5/2022  Tsurumi .............. G06F 3/04883
2007/0069026 A1    3/2007  Aoyama
(Continued)

FOREIGN PATENT DOCUMENTS

JP    2007-033257    2/2007
JP    2007-090448    4/2007
(Continued)

OTHER PUBLICATIONS

International Search Report and Written Opinion for International Application No. PCT/JP2020/047829 mailed on Mar. 23, 2021, 9 pages.

*Primary Examiner* — Calvin C Ma
(74) *Attorney, Agent, or Firm* — Amin, Turocy & Watson, LLP (57) ABSTRACT

A terminal device includes a calculation unit that calculates a relative position between the terminal device and a display device that displays virtual reality to be used by a user, a display control unit that changes a photographing range to be photographed in the virtual reality displayed on the display device, based on the relative position, and a video data acquisition unit that acquires video data related to video in the virtual reality photographed in the photographing range that is changed by the display control unit.

6 Claims, 9 Drawing Sheets

(58) Field of Classification Search
USPC .......................................................... 345/156
See application file for complete search history.

(56) References Cited

U.S. PATENT DOCUMENTS

| | | | |
|---|---|---|---|
| 2007/0092161 A1 | 4/2007 | Aratani et al. | |
| 2018/0322681 A1 | 11/2018 | Inomata et al. | |
| 2019/0025586 A1 | 1/2019 | Sawaki | |
| 2019/0043263 A1* | 2/2019 | Nakashima | G06F 3/0346 |

FOREIGN PATENT DOCUMENTS

| | | |
|---|---|---|
| JP | 2017-146651 | 8/2017 |
| JP | 2019-020908 | 2/2019 |
| JP | 2019-061434 | 4/2019 |
| JP | 2019-211835 | 12/2019 |
| JP | 2020-035392 | 3/2020 |
| JP | 2020-091897 | 6/2020 |

* cited by examiner

TERMINAL DEVICE, METHOD, AND COMPUTER PROGRAM

CROSS-REFERENCE TO RELATED APPLICATION

This application is a Continuation of PCT International Application No. PCT/JP2020/047829 filed on Dec. 22, 2020 which claims the benefit of priority from Japanese Patent Application No. 2020-146358 filed on Aug. 31, 2020, the entire contents of both of which are incorporated herein by reference.

BACKGROUND

1. Technical Field

The present disclosure relates to a terminal device, a method, and a computer program.

2. Description of the Related Art

A technology that enables a plurality of users to experience a virtual reality (VR) space having realized VR has been known.

For example, Japanese Patent Application Laid-open No. 2019-211835 describes a technology that allows a plurality of users to experience VR while simultaneously moving the positions and directions of their viewpoints within the VR space.

It is assumed that a variety of communications between multiple users will be realized in the VR space. For example, a situation is assumed in which each user uses an individually created avatar to virtually go to an exhibition facility such as a museum or a theme park, go on a trip, or participate in a common game in a VR space. Therefore, it is desirable to record the memories in the VR space by taking pictures of scenery or group photos among avatars through a predetermined operation in a real world.

SUMMARY

It is an object of the present disclosure to at least partially solve the problems in the conventional technology.

A terminal device according to an embodiment of the present disclosure includes a calculation unit that calculates a relative position between the terminal device and a display device that displays virtual reality to be used by a user, a display control unit that causes a virtual terminal device to display in accordance with a control signal from the terminal device in a space of the virtual reality and based on the relative position, changes a photographing range displayed on the virtual terminal device in the space of the virtual reality displayed on the display device, and a video data acquisition unit that acquires photographing data related to video in the space of the photographing range that is changed by the display control unit in the space of the virtual reality. The display control unit causes a display unit of the virtual terminal device to display video related to the photographing data acquired by the video data acquisition unit, the virtual terminal device has a photographing mode of a front camera for photographing an image in the photographing range including an avatar of the user and an avatar of another user in the same space of the virtual reality, and a storage control unit that saves, in a storage unit, the photographing data in the photographing range according to the photographing mode acquired by the video data acquisition unit, based on a saving operation is further provided.

A method according to an embodiment of the present disclosure includes calculating a relative position between a terminal device and a display device that displays virtual reality to be used by a user, causing a virtual terminal device to display in accordance with a control signal from the terminal device in a space of the virtual reality and based on the relative position, changing a photographing range displayed on the virtual terminal device in the space of the virtual reality displayed on the display device, acquiring photographing data related to video in a space of the photographing range that is changed in the virtual space, causing a display unit of the virtual terminal device to display video related to the photographing data acquired by the video data acquisition unit, setting a photographing mode of the virtual terminal device to a photographing mode of a front camera for photographing an image in the photographing range including an avatar of the user and an avatar of another user in the same space of the virtual reality, and saving the photographing data in the photographing range according to the photographing mode in a storage unit, based on a saving operation.

A non-transitory computer readable recording medium storing therein a computer program according to an embodiment of the present disclosure is disclosed. The computer program causes a computer to execute calculating a relative position between a terminal device and a display device that displays virtual reality to be used by a user, causing a virtual terminal device to display in accordance with a control signal from the terminal device in a space of the virtual reality and based on the relative position, changing a photographing range displayed on the virtual terminal device in the space of the virtual reality displayed on the display device, acquiring photographing data related to video in a space of the photographing range that is changed in the virtual space, causing a display unit of the virtual terminal device to display video related to the photographing data acquired by the video data acquisition unit, setting a photographing mode of the virtual terminal device to a photographing mode of a front camera for photographing an image in the photographing range including an avatar of the user and an avatar of another user in the same space of the virtual reality, and saving the photographing data in the photographing range according to the photographing mode in a storage unit, based on a saving operation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present disclosure will hereinafter be described in detail with reference to the accompanying drawings. The present disclosure is not limited by the embodiments, and if there is more than one embodiment, the combination of the embodiments is also included. In the following embodiments, the same parts are denoted with the same symbol and the redundant explanation is omitted.

Information Processing System

Figure 1:
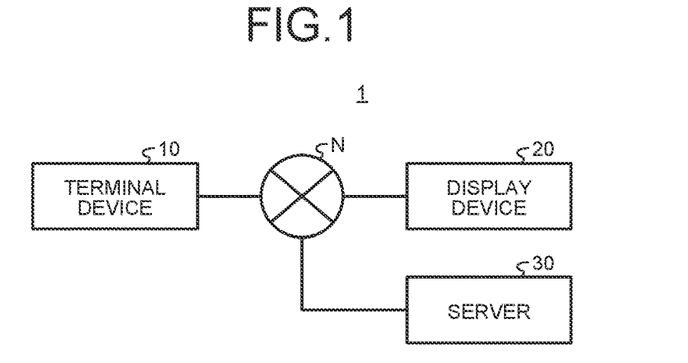
FIG. 1 is a diagram for describing a structure example of an information processing system according to an embodiment.

With reference to FIG. 1, an information processing system according to an embodiment is described. FIG. 1 is a diagram for describing a structure example of the information processing system according to the embodiment.

As illustrated in FIG. 1, an information processing system 1 includes a terminal device 10, a display device 20, and a server 30. The terminal device 10, the display device 20, and the server 30 are connected to each other via a network N so that communication therebetween is possible. The information processing system 1 is a system in which memories in a VR space can be recorded. The terminal device 10 is a device that includes, for example, a smartphone or a tablet terminal. The display device 20 is, for example, a device that allows a user to experience VR. The display device 20 is, for example, a device that includes a head mounted display (HMD) that is worn on the user's head. A user can experience, for example, a theme park in a VR space using avatars with other users on the server 30 while wearing the display device 20 on the head.

Terminal Device

Figure 2:
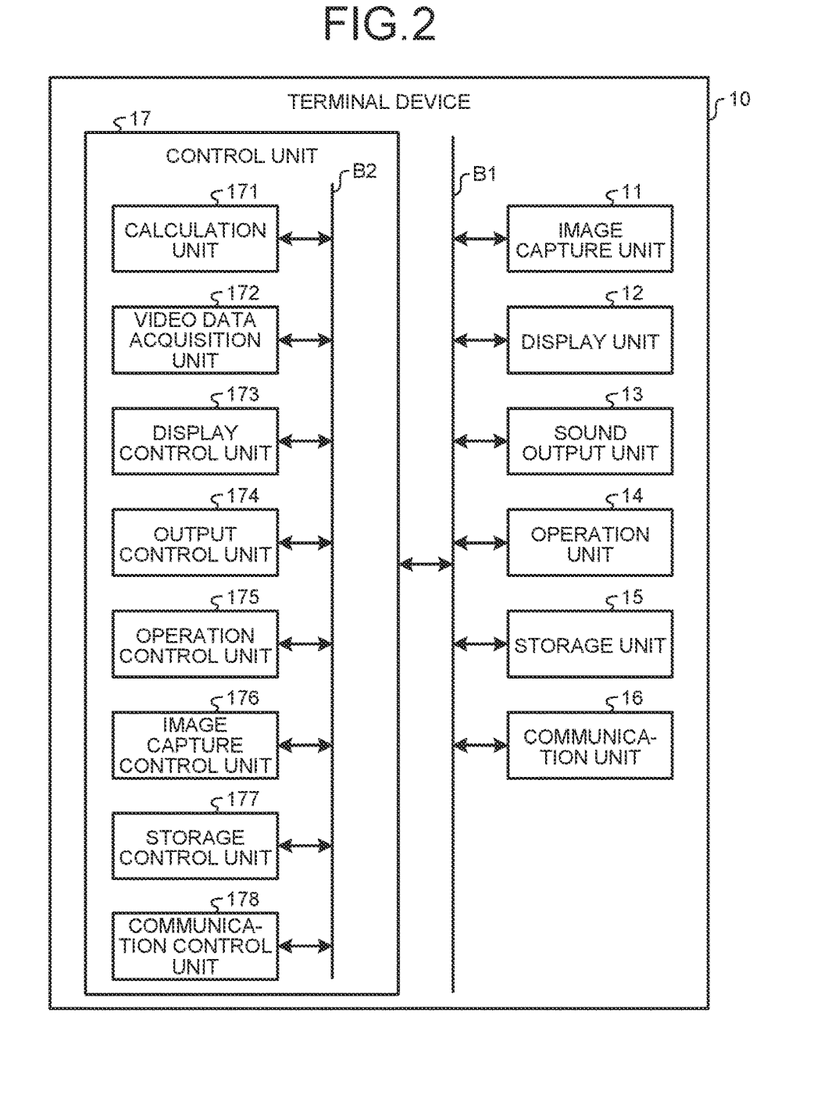
FIG. 2 is a block diagram illustrating a structure example of a terminal device according to the embodiment.

With reference to FIG. 2, a structure of the terminal device according to the embodiment is described. FIG. 2 is a block diagram illustrating a structure example of the terminal device according to the embodiment.

As illustrated in FIG. 2, the terminal device 10 includes a display unit 12, a sound output unit 13, an operation unit 14, a storage unit 15, a communication unit 16, and a control unit 17. The display unit 12, the sound output unit 13, the operation unit 14, the storage unit 15, the communication unit 16, and the control unit 17 are connected to each other through a bus B1.

An image capture unit 11 photographs various kinds of video around the terminal device 10. The image capture unit 11 photographs the display device 20, for example. The image capture unit 11 includes an image capture element, a circuit that generates video data on the basis of the output of the image capture element, and the like, which are not illustrated. Examples of the image capture element include, but are not limited to, a complementary metal oxide semiconductor (CMOS) image sensor and a charge coupled device (CCD).

The display unit 12 displays various kinds of information. The display unit 12 displays, for example, various kinds of video. The display unit 12 displays, for example, an identifier for calculating the relative position between the terminal device 10 and the display device 20. The identifier is described below. The display unit 12 includes a display including, for example, a liquid crystal display (LCD) or an organic electro-luminescence display.

The sound output unit 13 outputs various kinds of sounds. The sound output unit 13 can be realized by, for example, a speaker.

The operation unit 14 receives various operations on the terminal device 10 from the user. The operation unit 14 includes a button, a switch, or a touch panel, for example. The operation unit 14 receives, for example, operations to start or end communication with the display device 20. The operation unit 14 receives, for example, operations for photographing and acquiring video displayed on the display device 20 and for storing the photographed video in the storage unit 15.

The storage unit 15 stores various kinds of information therein. The storage unit 15, for example, stores therein video data of the scenery and various objects such as buildings and characters in the VR space displayed on the display device 20. The storage unit 15 may store therein video data rendered in two-dimensional video, information specifying the three-dimensional object and the photographing range, or only information specifying the photographing range. The storage unit 15 can be realized, for example, by a semiconductor memory element such as a random access memory (RAM) or a flash memory, or a storage device such as a hard disk or a solid state drive.

The communication unit 16 performs communication between the terminal device 10 and an external device. The communication unit 16, for example, performs the communication with the display device 20.

The control unit 17 controls the operation of each part of the terminal device 10. The control unit 17 is achieved in a manner that a central processing unit (CPU), a microprocessing unit (MPU), or the like executes a computer program (for example, computer program according to the present disclosure) stored in a storage unit, which is not illustrated, using a RAM or the like as a working area. The control unit 17 may be achieved by an integrated circuit such as an application specific integrated circuit (ASIC) or a field programmable gate array (FPGA), for example. The control unit 17 may be achieved by a combination of hardware and software.

The control unit 17 includes a calculation unit 171, a video data acquisition unit 172, a display control unit 173, an output control unit 174, an operation control unit 175, an image capture control unit 176, a storage control unit 177, and a communication control unit 178.

The calculation unit 171 calculates the relative position between the terminal device 10 and the display device 20. The calculation unit 171 calculates the relative distance between the terminal device 10 and the display device 20 on the basis of, for example, the size of the identifier displayed on the display unit 12 that is photographed by an external image capture device, which is acquired by the video data acquisition unit 172. The calculation unit 171 may calculate the relative distance between the terminal device 10 and the display device 20 on the basis of, for example, a table, which is not illustrated, where the relative distance between the terminal device 10 and the display device 20 is associated with the size of the identifier in the photographed video. The calculation unit 171 calculates the tilt of the terminal device 10 relative to the display device 20 on the basis of, for example, the degree of distortion and the direction of distortion of the identifier displayed on the display unit 12. The calculation unit 171 calculates the relative position between the terminal device 10 and the display device 20 on the basis of, for example, the relative distance between the terminal device 10 and the display device 20 and the tilt of the terminal device 10 relative to the display device 20.

Figure 3:
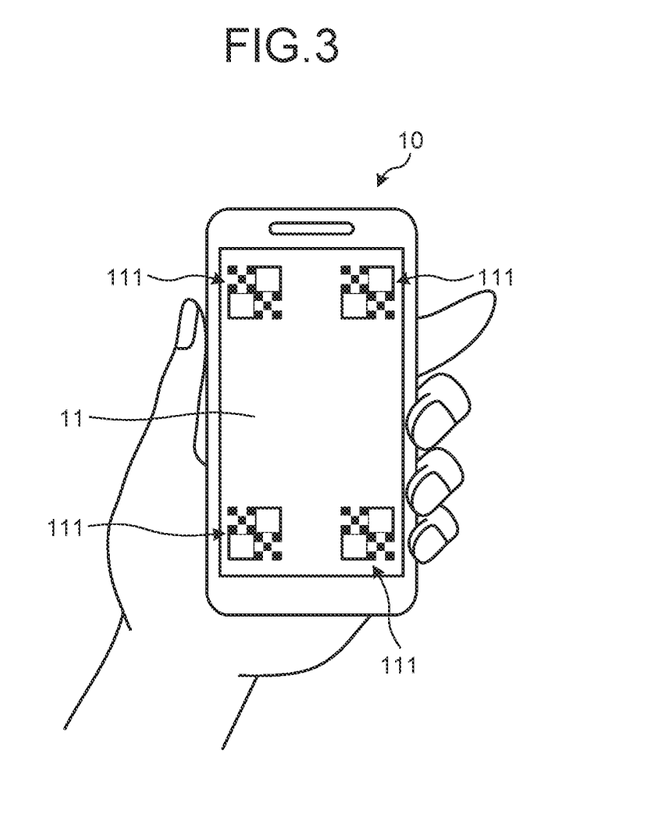
FIG. 3 is a diagram for describing identifiers displayed on a display unit.

FIG. 3 is a diagram for describing the identifiers displayed on the display unit 12. As illustrated in FIG. 3, the calculation unit 171 calculates the relative distance between the terminal device 10 and the display device 20 on the basis of, for example, the size of an identifier 111 displayed on the display unit 12 that is photographed by an image capture unit 21 of the display device 20. The calculation unit 171 calculates the tilt of the terminal device 10 relative to the display device 20 on the basis of, for example, the degree of distortion and the direction of distortion of the identifier 111 displayed on the display unit 12 that is photographed by the image capture unit 21 of the display device 20. The calculation unit 171 calculates the relative position between the terminal device 10 and the display device 20 on the basis of, for example, the relative distance between the terminal device 10 and the display device 20 and the tilt of the terminal device 10 relative to the display device 20. The calculation unit 171 may, for example, calculate the relative position between the terminal device 10 and the display device 20 on the basis of the size of the identifier 111 photographed by another external camera. The identifiers 111 are displayed at the four corners of the display unit 12, for example. The identifier 111 is, for example, but not limited to, a QR code (registered trademark). One identifier 111 may be displayed in the center of the display unit 12, for example.

The calculation unit 171 may calculate the relative position between the terminal device 10 and the display device 20 on the basis of photographing data of the display device 20 that is photographed by the image capture unit 11. The calculation unit 171 may, for example, determine the size of the display device 20 included in the photographing data using a well-known image recognition process and calculate the relative position between the terminal device 10 and the display device 20 on the basis of the determined size. In this case, the calculation unit 171 may calculate the relative distance between the terminal device 10 and the display device 20 on the basis of, for example, a table in which the size of the display device 20 and the relative distance between the terminal device 10 and the display device 20 are associated. For example, the calculation unit 171 may calculate the tilt of the terminal device 10 relative to the display device 20 on the basis of the degree of distortion and the direction of distortion of the display device 20.

The calculation unit 171 may calculate the relative position between the terminal device 10 and the display device 20 on the basis of the photographing data of the identifier such as a QR code provided on a housing of the display device 20 that is photographed by the image capture unit 11. The calculation unit 171 may, for example, determine the size and distortion of the identifier in the photographing data using a well-known image recognition process, and calculate the relative distance between the terminal device 10 and the display device 20 and the tilt of the terminal device 10 relative to the display device 20 on the basis of the determined size. The calculation unit 171 may calculate the relative position between the terminal device 10 and the display device 20 by grasping the relative distance between the terminal device 10 and the display device 20 and the tilt of the terminal device 10 relative to the display device 20 on the basis of, for example, the determined size and distortion of the identifier. In this case, the calculation unit 171 may calculate the relative distance between the terminal device 10 and the display device 20 on the basis of, for example, a table in which the size of the identifier and the relative distance between the terminal device 10 and the display device 20 are associated. The calculation unit 171 may calculate the tilt of the terminal device 10 relative to the display device 20 on the basis of, for example, the degree of distortion and the direction of distortion of the identifier.

The video data acquisition unit 172 acquires various kinds of video data. The video data acquisition unit 172, for example, acquires from the display device 20, the video data photographed by a virtual terminal device in the VR space displayed on the display device 20. In a case where the operation control unit 175 has acquired an operation signal for photographing video in the VR space displayed on the display device 20 that is input to the operation unit 14, for example, the video data acquisition unit 172 acquires the video data photographed by the virtual terminal device in the VR space that is displayed on the display device 20. Photographing with the virtual terminal device in the VR space refers to generating video that captures a predetermined range of the VR space from the position of a virtual camera equipped in the virtual terminal device in the VR space. The virtual terminal device in the VR space may have the shape and size that are either the same as or different from those of the terminal device 10. When the terminal device 10 includes the image capture unit 11, the position of the virtual camera in the virtual terminal device may be either the same as or different from the position of the image capture unit 11 in the terminal device 10. When the terminal device 10 includes the image capture unit 11, the characteristics of the virtual camera may be either the same as or different from the characteristics of the image capture unit 11. The characteristics of the virtual camera may be changed as needed by the user's operation in the VR space, such as angle widening or telephoto operation (zoom in or zoom out). The user may be able to perform operations in the VR space through an operation screen displayed on a display unit of the virtual terminal device.

The display control unit 173 causes the display unit 12 to display various kinds of video. The display control unit 173 causes the display unit 12 to display an identifier for calculating the relative position between the terminal device 10 and the display device 20, for example. The display control unit 173 causes the display unit 12 to display the video related to the video data photographed in the VR space that the video data acquisition unit 172 has acquired from the display device 20.

The display control unit 173, for example, controls the photographing range to be displayed on the display unit of the virtual terminal device when photographing various objects in the VR space with the virtual terminal device in the VR space displayed on the display device 20. The display control unit 173, for example, controls the photographing range to be displayed on the display unit of the virtual terminal device in the VR space on the basis of the relative position between the real terminal device 10 and the display device 20. Specifically, the display control unit 173 controls so that the photographing range to be displayed on the display unit of the virtual terminal device in the VR space changes depending on the change in the relative position between the real terminal device 10 and the display device 20, for example. The display control unit 173 outputs through the communication unit 16 to the display device 20, a control signal for changing the photographing range to be displayed on the virtual terminal device in the VR space, for example.

The display control unit 173, for example, generates an avatar of a user who uses the terminal device 10 and the display device 20 to be displayed on the video displayed on the display device 20. The display control unit 173, for example, generates the avatar on the basis of the video data of the face of the user who uses the terminal device 10 and the display device 20. The display control unit 173 may, for example, change each part of the avatar's face on the basis of operation information received from the user through the operation unit 14. The display control unit 173, for example, outputs a control signal for displaying the generated avatar on the display device 20 via the communication unit 16 to the display device 20.

The output control unit 174 controls the sound output unit 13 to output a sound.

The operation control unit 175 acquires the operation signal related to the operation input to the operation unit 14. The operation control unit 175, for example, outputs a control signal related to the acquired operation signal to control the operation of the terminal device 10. The operation control unit 175, for example, acquires an operation signal related to the operation for photographing the video in the VR space displayed on the display device 20 that is input to the operation unit 14.

The image capture control unit 176 controls the image capture unit 11. The image capture control unit 176 sets an image capture condition by the image capture unit 11 and causes the image capture unit 11 to capture images. The image capture control unit 176, for example, controls the image capture unit 11 to capture an image of an identifier such as a QR code provided on the housing. When the display unit 12 of the terminal device 10 displays the identifier such as a QR code, the image capture unit 11 and the image capture control unit 176 are unnecessary.

The storage control unit 177 stores various kinds of data in the storage unit 15. The storage control unit 177, for example, causes the storage unit 15 to store therein the video data related to the video photographed in the VR space displayed on the display device 20 that is acquired by the video data acquisition unit 172.

The communication control unit 178 controls the communication between the terminal device 10 and the external device by controlling the communication unit 16. The communication control unit 178, for example, controls the communication between the terminal device 10 and the display device 20 by controlling the communication unit 16.

Display Device

Figure 4:
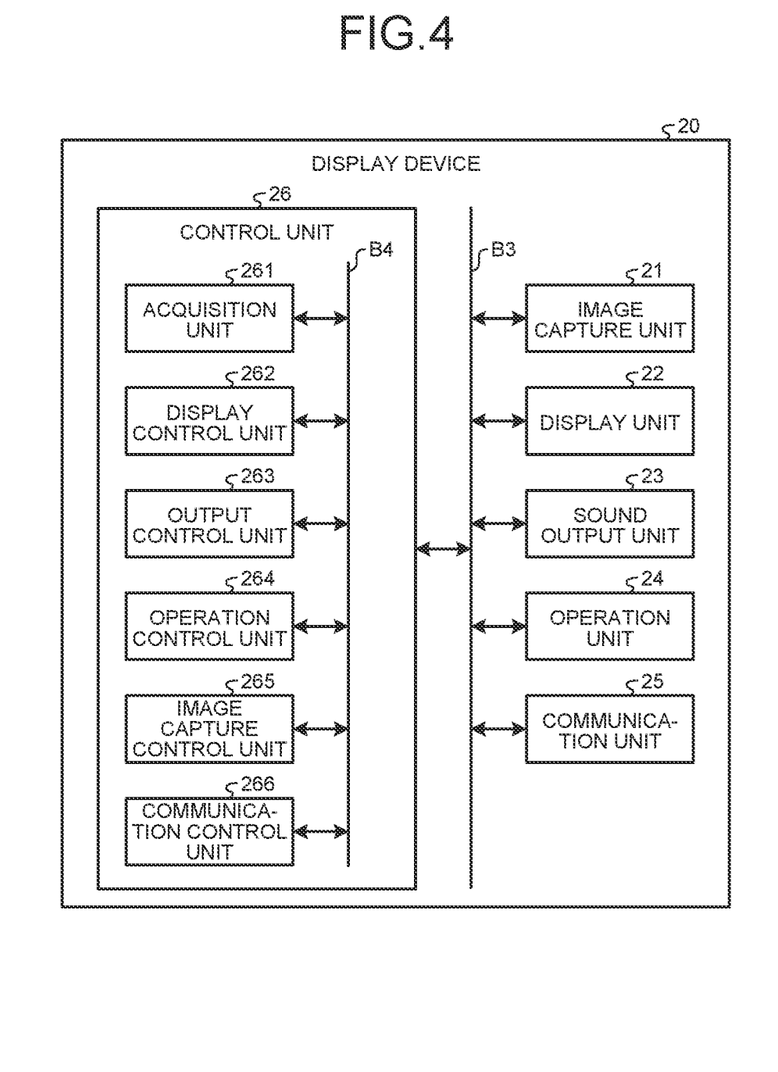
FIG. 4 is a block diagram illustrating a structure example of a display device according to the embodiment.

With reference to FIG. 4, a structure of the display device according to the embodiment is described. FIG. 4 is a block diagram illustrating a structure example of the display device according to the embodiment.

As illustrated in FIG. 4, the display device 20 includes the image capture unit 21, a display unit 22, a sound output unit 23, an operation unit 24, and a communication unit 25. The image capture unit 21, the display unit 22, the sound output unit 23, the operation unit 24, and the communication unit 25 are connected to each other through a bus B3.

In this embodiment, the display device 20 is described as a device including, but not limited to, an HMD that is worn on the user's head. The display device 20 may be a display device including a display such as a liquid crystal display or an organic EL display, which is installed on a desk in a room, for example.

The image capture unit 21 photographs various kinds of video around the display device 20. The image capture unit 21 photographs the identifier 111 displayed on the display unit 12 of the terminal device 10, for example. The image capture unit 21 includes an image capture element, a circuit that generates video data on the basis of the output of the image capture element, and the like, which are not illustrated. The image capture element may be, but not limited to, a CMOS image sensor or a CCD.

The display unit 22 displays various kinds of video. The display unit 22, for example, displays the video in the VR space. The display unit 22 is realized, for example, as an HMD.

The sound output unit 23 outputs various kinds of sounds. The sound output unit 23 can be realized by, for example, a speaker.

The operation unit 24 receives various operations from the user for the display device 20. The operation unit 24 includes, for example, a button or a switch. The operation unit 24 receives, for example, the operations to start or end the communication with the terminal device 10.

The communication unit 25 performs the communication between the display device 20 and the external device. The communication unit 25, for example, performs the communication with the terminal device 10. The communication unit 25, for example, performs the communication with the server 30.

A control unit 26 controls the operation of each part of the display device 20. The control unit 26 is achieved in a manner that a CPU, an MPU, or the like executes a computer program stored in a storage unit, which is not illustrated, using a RAM or the like as a working area. The control unit 26 may be achieved by an integrated circuit, such as an ASIC or an FPGA. The control unit 26 may be achieved by a combination of hardware and software.

The control unit 26 includes an acquisition unit 261, a display control unit 262, an output control unit 263, an operation control unit 264, an image capture control unit 265, and a communication control unit 266. The acquisition unit 261, the display control unit 262, the output control unit 263, the operation control unit 264, the image capture control unit 265, and the communication control unit 266 are connected to each other through a bus B4.

The acquisition unit 261 acquires various kinds of information. The acquisition unit 261, for example, acquires the video data related to the video of the identifier 111 displayed on the display unit 12 of the terminal device 10 that is photographed by the image capture unit 21.

The display control unit 262 controls the video displayed on the display unit 22. The display control unit 262 causes the display unit 22 to display the video related to VR, for example. The display control unit 262 causes the display unit 22 to display the video to make the users experience a theme park or the like in the VR space, for example. The display control unit 262 changes the display range of the video displayed on the display unit 22 or displays the avatar on the video displayed on the display unit 22 in accordance with the control signal received from the terminal device 10, for example. The display control unit 262 changes the photographing range displayed on the virtual terminal device in the VR space displayed on the display unit 22 in accordance with the control signal received from the terminal device 10, for example. The control signal that the display control unit 262 receives from the terminal device 10 is the control signal generated based on the operation of the user on the operation screen displayed on the display unit of the virtual terminal device in the VR space with the operation unit 14 of the terminal device 10, for example. When the display unit 12 of the terminal device 10 displays the identifier 111, the user actually operates the terminal device 10 in his/her hand, but the display unit 12 displays the identifier 111 and the operation screen is not displayed. Meanwhile, the control signal generated based on the operation is transmitted from the terminal device 10 to the display device 20, and the display control unit 262 controls the operation screen displayed on the display unit of the virtual terminal device in the VR space corresponding to the terminal device 10 on the basis of the control signal. The user perceives the behavior of the virtual operation screen through his/her vision from the display device 20 and perceives the actual operation through the touch from the terminal device 10. The terminal device 10 may generate vibration with an actuator, which is not illustrated, to provide feedback of the operation to the user.

The output control unit 263 causes the sound output unit 23 to output various kinds of sounds. The output control unit 263, for example, outputs the sound of other users in the VR space. The output control unit 263 causes the sound output unit 23 to output the sound of other users who are experiencing a theme park or the like together in the VR space.

The operation control unit 264 acquires the operation signal related to the operation input to the operation unit 24. The operation control unit 264, for example, outputs a control signal related to the acquired operation signal to control the operation of the display device 20.

The image capture control unit 265 controls the image capture unit 21. The image capture control unit 265 sets an image capture condition by the image capture unit 21 and causes the image capture unit 21 to capture images.

The communication control unit 266 controls the communication unit 25 to control the communication between the display device 20 and the external device. The communication control unit 266, for example, controls the communication between the terminal device 10 and the display device 20 by controlling the communication unit 25. The communication control unit 266 controls the communication unit 25 to control the communication between the display device 20 and the server 30, for example.

Server

Figure 5:
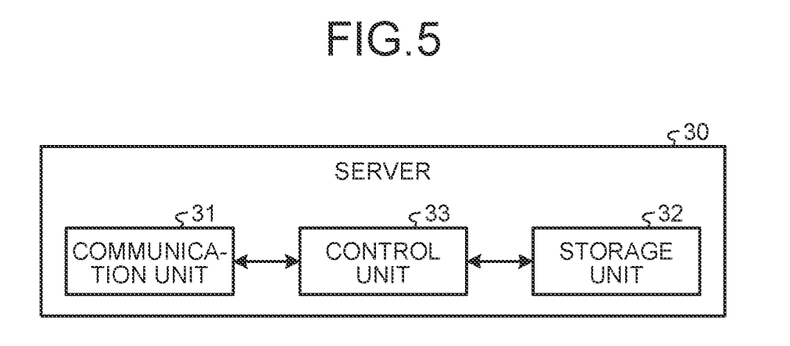
FIG. 5 is a block diagram illustrating a structure example of a server according to the embodiment.

With reference to FIG. 5, a structure of the server according to the embodiment is described. FIG. 5 is a block diagram illustrating a structure example of the server according to the embodiment.

As illustrated in FIG. 5, the server 30 includes a communication unit 31, a storage unit 32, and a control unit 33.

The communication unit 31 performs the communication between the server 30 and an external device. The communication unit 31, for example, performs the communication with the terminal device 10. The communication unit 31, for example, performs the communication with the display device 20.

The storage unit 32 stores various kinds of information therein. The storage unit 32 stores map information in the VR space therein, for example. The map information includes various kinds of information such as scenery, buildings, and characters in the VR space. The storage unit 32 can be realized by a semiconductor memory element such as a RAM or a flash memory, or a storage device such as a hard disk or a solid state drive.

The control unit 33 controls the operation of each part of the server 30. The control unit 33 is achieved in a manner that a CPU, an MPU, or the like executes a computer program stored in a storage unit, which is not illustrated, using a RAM or the like as a working area. The control unit 33 may be realized by an integrated circuit, such as an ASIC or an FPGA. The control unit 33 may be achieved by a combination of hardware and software.

The control unit 33 generates a VR space on the basis of the map information stored in the storage unit 32. The control unit 33 generates a VR space where a virtual theme park or the like can be experienced, for example. The connection between the display device 20 and the server 30 allows the user of the display device 20 to experience, for example, a virtual theme park with multiple users using avatars.

How to Use Terminal Device and Display Device

Figure 6:
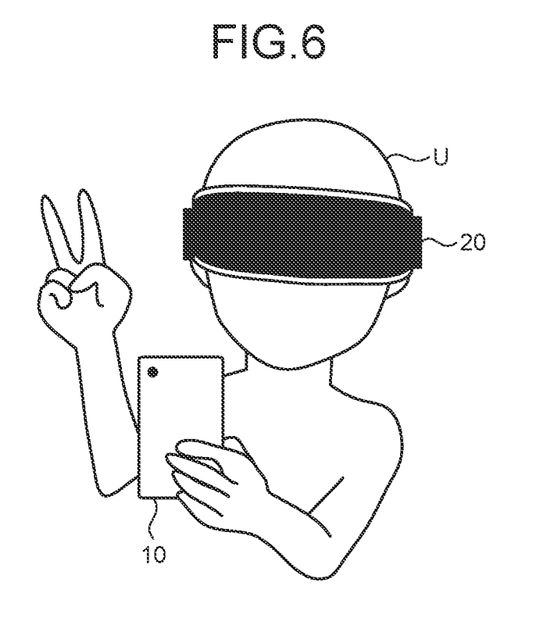
FIG. 6 is a diagram for describing how to use the terminal device and the display device according to the embodiment.
Figure 7:
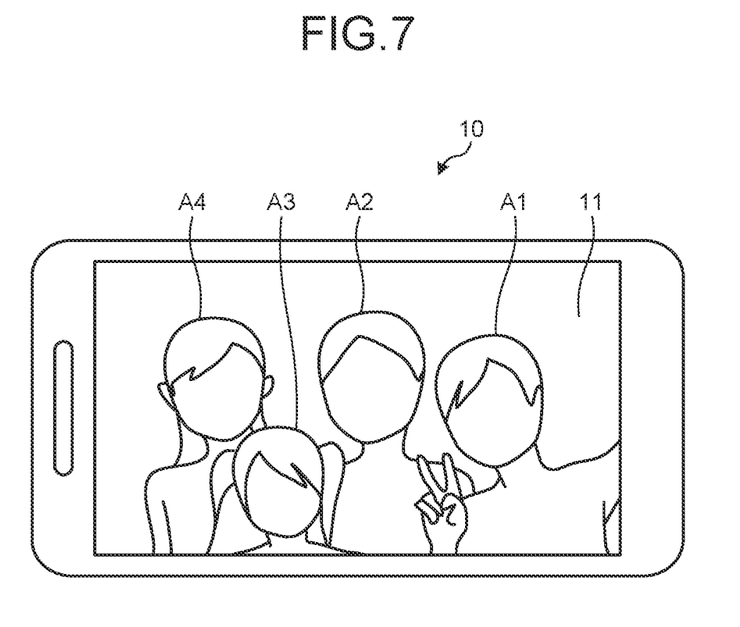
FIG. 7 is a diagram for describing how to use the terminal device and the display device according to the embodiment.

With reference to FIG. 6 and FIG. 7, how to use the terminal device and the display device according to the embodiment is described. FIG. 6 and FIG. 7 are diagrams for describing how to use the terminal device and the display device according to the embodiment.

As illustrated in FIG. 6, the display device 20 is worn on the head of a user U, for example. In other words, the user U can experience a virtual theme park or the like in a VR space using the display device 20. The user U can, for example, photograph scenery or objects such as buildings and characters as memories of the theme park in the VR space, or take pictures with multiple other users by operating the terminal device 10 while using the display device 20.

FIG. 7 expresses the photographing data in the VR space. By operating the terminal device 10, for example, the user U can photograph an image including an avatar A1 of the user U and avatars A2, A3, and A4 of other users in the VR space using the virtual terminal device in the VR space. The image to be photographed may be either a still image or a moving image. The display range of the image to be photographed varies depending on the relative position between the terminal device 10 and the display device 20. In other words, the user U can change the photographing range of the VR space by adjusting the relative position between the terminal device 10 and the display device 20 in the real space. The photographing range in the VR space is displayed on the display unit of the virtual terminal device in the VR space. By adjusting the relative position between the terminal device 10 and the display device 20 in the real space, the photographing range to be displayed on the display unit of the virtual terminal device can be adjusted. Specifically, the user U can adjust the photographing range so that the avatar A1, the avatar A2, the avatar A3, and the avatar A4 appear in one picture in the VR space by adjusting the relative position between the terminal device 10 and the display device 20 in the real space.

Process in Terminal Device

Figure 8:
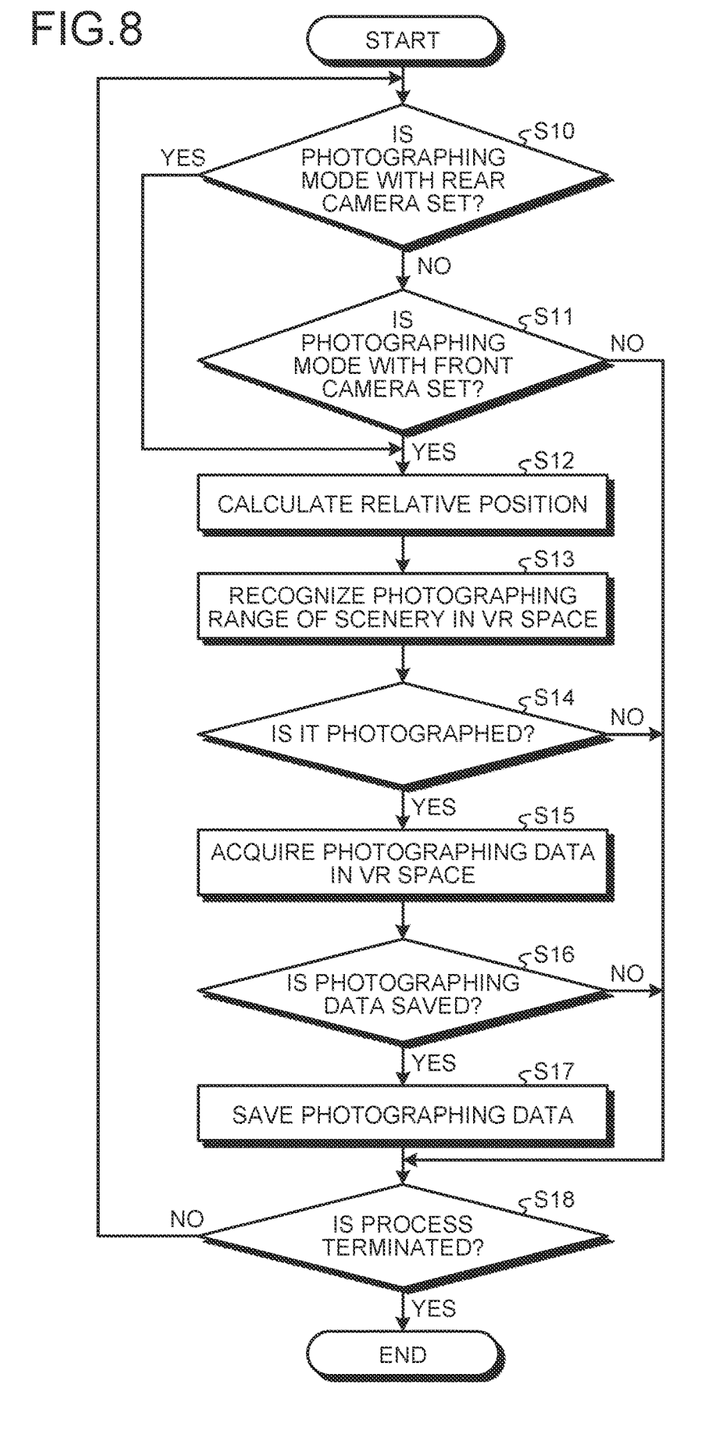
FIG. 8 is a flowchart expressing one example of a procedure of the terminal device according to the embodiment.

With reference to FIG. 8, a procedure of the process in the terminal device according to the embodiment is described. FIG. 8 is a flowchart expressing one example of the procedure of the process in the terminal device according to the embodiment.

First, the operation control unit 175 determines whether the photographing mode of the virtual camera in the VR space is set to the photographing mode for photographing with a rear camera via the operation unit 14 (step S10). If it is determined that the mode is set to the photographing mode of photographing with the rear camera (Yes at step S10), the process advances to step S12. If it is determined that the mode is not set to the photographing mode of photographing with the rear camera (No at step S10), the process advances to step S11.

If the determination is No at step S10, the operation control unit 175 determines via the operation unit 14 whether the photographing mode of the virtual camera in the VR space is set to the photographing mode for photographing with a front camera (step S11). If it is determined that the mode is set to the photographing mode of photographing with the front camera (Yes at step S11), the process advances to step S12. If it is determined that the mode is not set to the photographing mode of photographing with the front camera (No at step S11), the process advances to step S18.

If the determination is Yes at step S10 and the determination is Yes at step S11, the calculation unit 171 calculates the relative position between the terminal device 10 and the display device 20 (step S12). Specifically, the calculation unit 171 calculates the relative position between the terminal device 10 and the display device 20 on the basis of the size of the identifier 111 displayed on the display unit 12 of the terminal device 10 that is photographed by the image capture unit 21 of the display device 20. Then, the process advances to step S12.

The display control unit 173 recognizes the photographing range in the VR space displayed on the display device 20 on the basis of the relative position calculated by the calculation unit 171 (step S13). Specifically, the display control unit 173 recognizes the photographing range displayed on the display unit of the virtual terminal device in the VR space. Then, the process advances to step S14.

The operation control unit 175 determines whether an operation to photograph the photographing range in the VR space recognized at step S13 is received via the operation unit 14 (step S14). If it is determined that the operation to photograph the photographing range in the VR space is received (Yes at step S14), the process advances to step S15. If it is determined that the operation to photograph the photographing range in the VR space is not received (No at step S14), the process advances to step S18.

If the determination is Yes at step S14, the video data acquisition unit 172 acquires the photographing data related to the photographing range in the VR space that is photographed, from the display device 20 (step S15). Here, the display control unit 173 may cause the display unit 12 to display the video related to the photographing data in the VR space acquired by the video data acquisition unit 172. The photographing data may be either a still image or a moving image. This allows the user to grasp the video photographed in the VR space. Then, the process advances to step S16.

The operation control unit 175 determines whether an operation to save the photographing data acquired at step S15 is received via the operation unit 14 (step S16). If it is determined that the operation to save the photographing data is received (Yes at step S16), the process advances to step S17. If it is determined that the operation to save the photographing data is not received (No at step S16), the process advances to step S18.

If the determination is Yes at step S16, the storage control unit 177 saves the photographing data acquired at step S15 in the storage unit 15 (step S17). Then, the process advances to step S18.

The control unit 17 determines whether to terminate the process (step S18). Specifically, the operation control unit 175 determines that the process is terminated upon the reception of an operation to terminate the photographing or an operation to turn off the power of the terminal device 10. If it is determined that the process is terminated (Yes at step S18), the process in FIG. 8 is terminated. If it is determined that the process is not terminated (No at step S18), the process advances to step S10.

As described above, in the present embodiment, the photographing range in the VR space displayed on the display device 20 is photographed by the operation using the terminal device 10, and the photographed video data is saved in the terminal device 10. Since the scenery in the VR space and the memories in the virtual theme park or the like can be recorded in the terminal device 10 in this embodiment, it is easy to transmit photos taken in the VR space on social network service (SNS).

In this embodiment, it is possible to experience the virtual theme park and communicate with other users using the avatars in the VR space. This embodiment also allows the user to take a group photo with his/her own avatar and the avatars of other users in the same VR space.

First Modification

Figure 9:
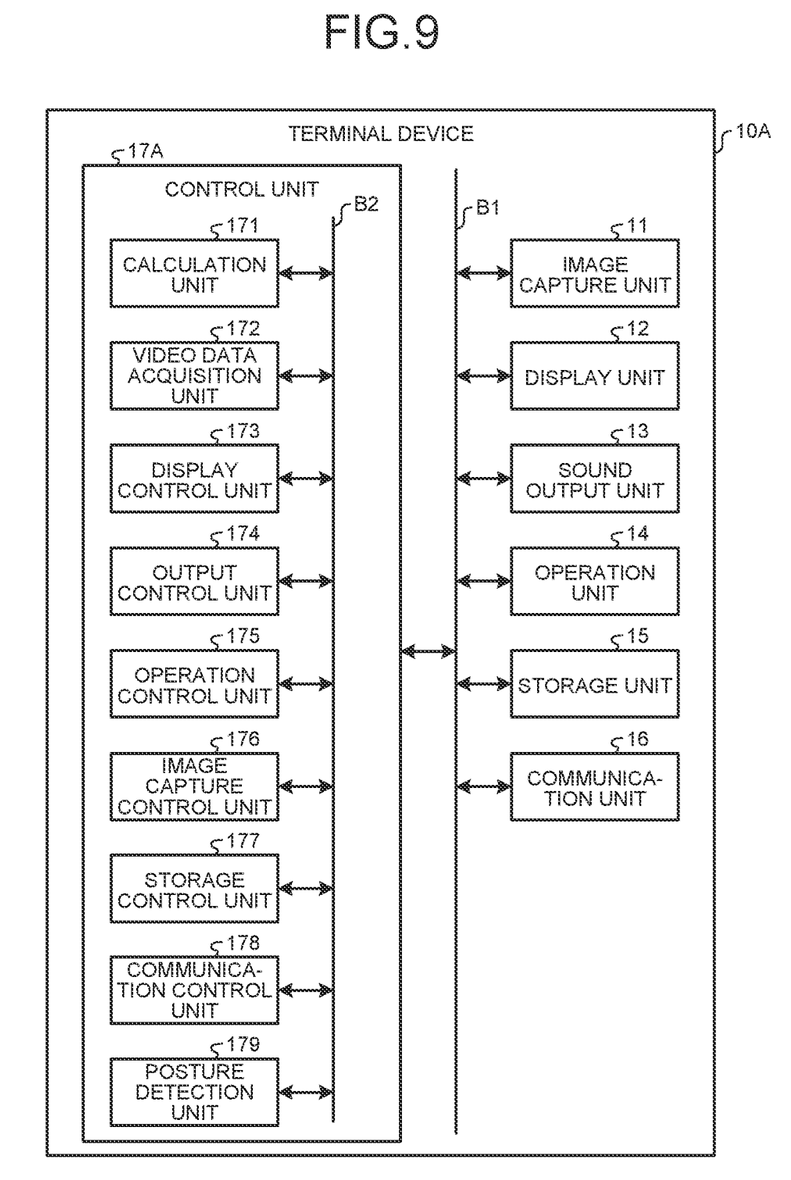
FIG. 9 is a block diagram illustrating a structure example of a terminal device according to a first modification.

With reference to FIG. 9, a first modification of the present embodiment is described. FIG. 9 is a block diagram illustrating a structure example of a terminal device according to the first modification.

As illustrated in FIG. 9, a terminal device 10A differs from the terminal device 10 illustrated in FIG. 2 in that a control unit 17A includes a posture detection unit 179.

The posture detection unit 179 detects the posture of the user experiencing VR using the display device 20. The posture detection unit 179 detects, for example, the posture of each part of the user, including the user's head, arms, and legs. In the first modification, for example, the video data acquisition unit 172 acquires the photographing data of the user from an external photographing device, which is not illustrated. In this case, the posture detection unit 179 may detect the user's posture on the basis of the photographing data acquired by the video data acquisition unit 172. The posture detection unit 179 may detect the user's posture using motion capture or other known techniques.

The display control unit 173 changes the posture of the user's avatar displayed on the display device 20 on the basis of the detection results of the posture detection unit 179. The display control unit 173, for example, raises the right hand of the user's avatar if the posture detection unit 179 detects that the user is raising his/her right hand. That is to say, the display control unit 173 changes the avatar's posture according to the user's posture detected by the posture detection unit 179.

As described above, in the first modification of this embodiment, the posture of the avatar in the VR space is changed in real time according to the posture of the user in the real space. Thus, in the first modification of the present disclosure, since the avatar's posture in the VR space can be changed easily, the usability is improved.

Second Modification

Figure 10:
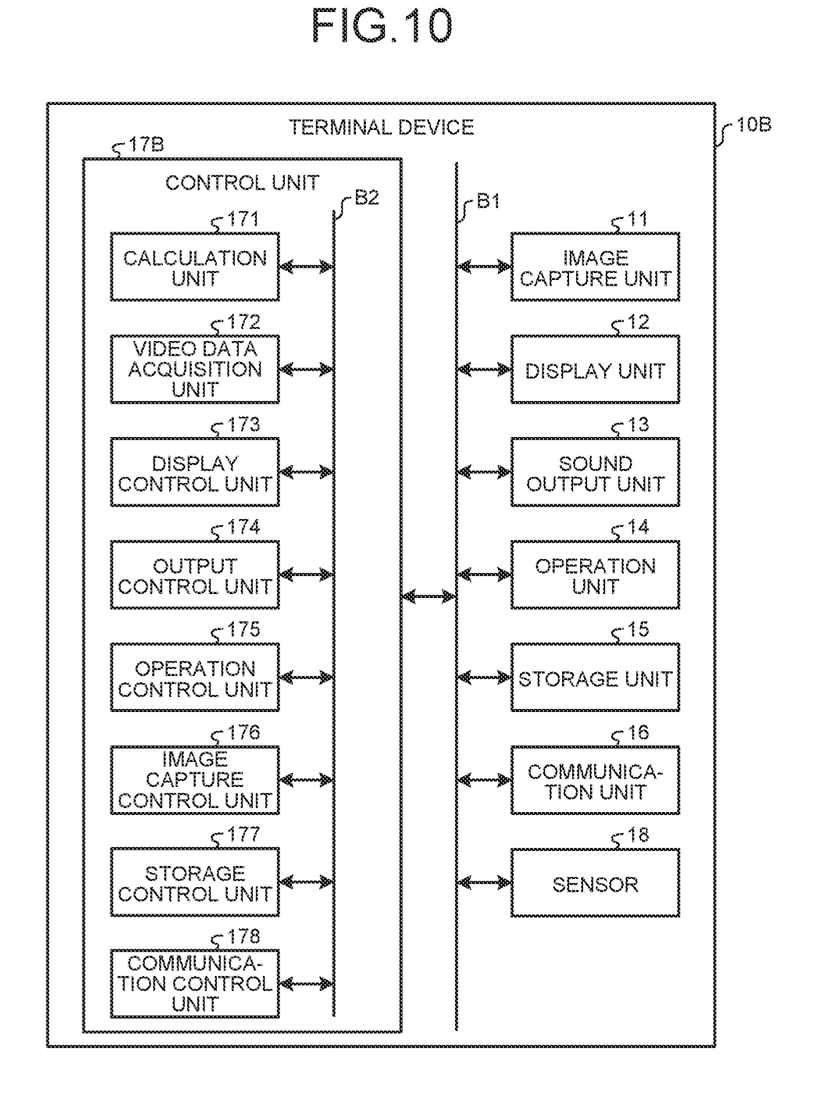
FIG. 10 is a block diagram illustrating a structure example of a terminal device according to a second modification.

With reference to FIG. 10, a second modification of the present embodiment is described. FIG. 10 is a block diagram illustrating a structure example of a terminal device according to the second modification.

As illustrated in FIG. 10, a terminal device 10B differs from the terminal device 10 illustrated in FIG. 2 in that the terminal device 10B includes a sensor 18.

The sensor 18 includes various kinds of sensors. The sensor 18 includes, for example, a sensor that detects the relative position between the terminal device 10B and the display device 20. Examples of the sensor 18 include, but are not limited to, a laser radar (e.g., Laser Imaging Detection and Ranging (LIDAR)), an infrared sensor that includes an infrared illuminator and a light receiving sensor, and a time-of-flight (ToF) sensor.

The calculation unit 171 of a control unit 17B calculates the relative position between the terminal device 10B and the display device 20 on the basis of the detection results by the sensor 18. In other words, in the second modification, the calculation unit 171 calculates the relative position between the terminal device 10B and the display device 20 using a spatial grasping means different from the image capture unit 11.

As described above, in the second modification of this embodiment, the relative position between the terminal device 10B and the display device 20 is calculated based on the detection results of various kinds of sensors. Thus, the degree of freedom in design can be improved in the second modification.

Third Modification

Figure 11:
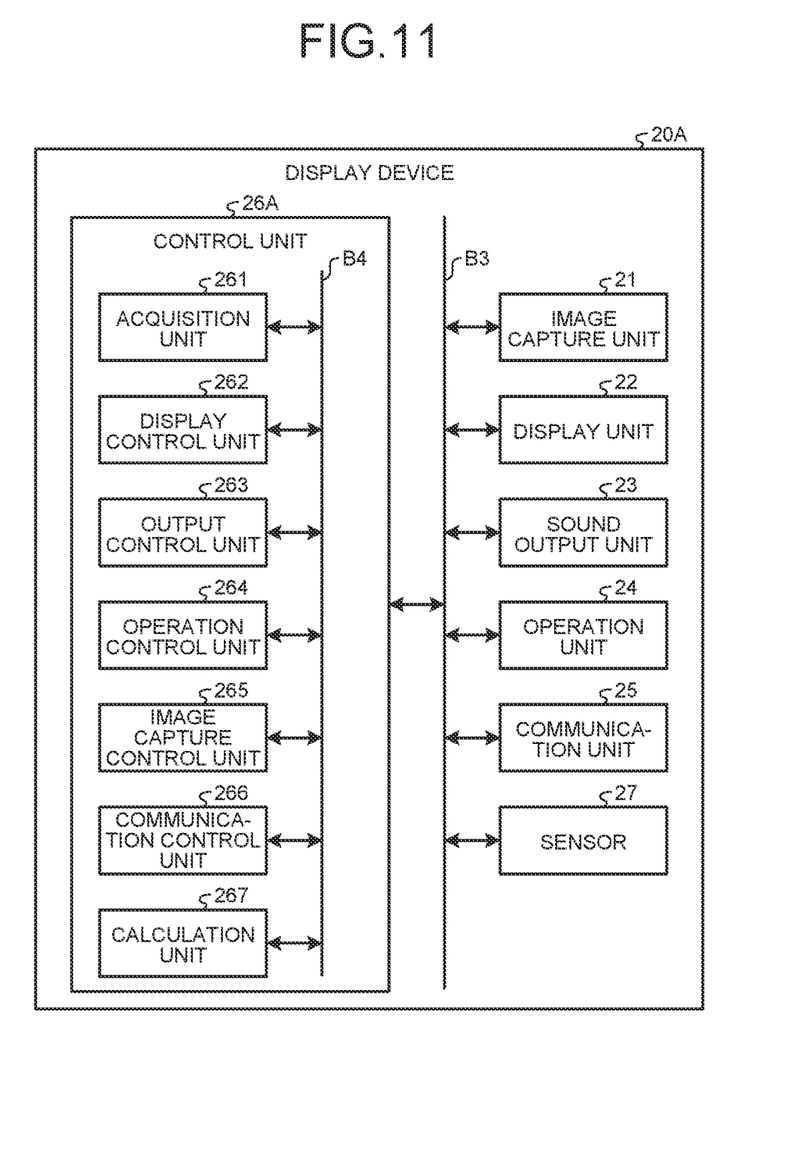
FIG. 11 is a block diagram illustrating a structure example of a display device according to the second modification.

With reference to FIG. 11, a third modification of the present embodiment is described. FIG. 11 is a block diagram illustrating a structure example of a display device according to the third modification.

As illustrated in FIG. 11, a display device 20A differs from the display device 20 illustrated in FIG. 4 in that the display device 20A includes a sensor 27 and a control unit 26A includes a calculation unit 267.

The sensor 27 includes various kinds of sensors. The sensor 27 includes, for example, a sensor that detects the relative position between the terminal device 10B and the display device 20. Examples of the sensor 27 include, but are not limited to, a laser radar (for example, LIDAR), an infrared sensor that includes an infrared illuminator and a light receiving sensor, and a ToF sensor.

The calculation unit 267 calculates the relative position between the terminal device 10 and the display device 20A on the basis of the detection results by the sensor 27. In other words, the relative position between the terminal device 10 and the display device 20A may be calculated by the display device 20A instead of the terminal device 10. In this case, the display device 20A calculates the information regarding the calculated relative position between the terminal device 10 and the display device 20A to the terminal device 10 via the communication unit 25. Then, the display control unit 173, for example, changes the photographing range to be displayed on the display unit of the virtual terminal device in the VR space displayed on the display device 20A on the basis of the relative position between the terminal device 10 and the display device 20A calculated by the calculation unit 267.

As mentioned above, in the third modification of this embodiment, the relative position between the terminal device 10 and the display device 20A is calculated by the display device 20A on the basis of the detection results of the sensor. Thus, the degree of freedom in design can be improved in the third modification.

According to the present disclosure, memories of activities in the VR space can be recorded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A terminal device comprising:
 a calculation unit that calculates a relative position between the terminal device and a display device that displays virtual reality to be used by a user;
 a display control unit that causes a virtual terminal device to display in accordance with a control signal from the terminal device in a space of the virtual reality and, based on the relative position, changes a photographing range displayed on the virtual terminal device in the space of the virtual reality displayed on the display device; and
 a video data acquisition unit that acquires photographing data related to video in the space of the photographing range that is changed by the display control unit, wherein
 the display control unit causes a display unit of the virtual terminal device to display video related to the photographing data acquired by the video data acquisition unit,
 the virtual terminal device has a photographing mode of a front camera for photographing the photographing range including an avatar of the user and an avatar of another user in a same space of the virtual reality in an image, and
 the terminal device further comprises a storage control unit that saves, in a storage unit and based on a saving operation, the photographing data in the photographing range according to the photographing mode acquired by the video data acquisition unit.

2. The terminal device according to claim 1, wherein
 the video data acquisition unit acquires video data related to video of an identifier displayed on a display unit of the terminal device that is photographed by an external image capture device or an image capture unit of the display device, or acquires video data related to video of an identifier provided on the display device that is photographed by the image capture unit of the terminal device, and
 the calculation unit calculates the relative position based on the video data of the identifier.

3. The terminal device according to claim 2, further comprising a posture detection unit that detects a posture of the user, wherein
 the display control unit changes a posture of an avatar of the user displayed on the display device according to the posture of the user detected by the posture detection unit.

4. The terminal device according to claim 1, further comprising a posture detection unit that detects a posture of the user, wherein
 the display control unit changes a posture of an avatar of the user displayed on the display device according to the posture of the user detected by the posture detection unit.

5. A method comprising:
 calculating a relative position between a terminal device and a display device that displays virtual reality to be used by a user;
 causing a virtual terminal device to display in accordance with a control signal from the terminal device in a space of the virtual reality and, based on the relative position, changing a photographing range displayed on the virtual terminal device in the space of the virtual reality displayed on the display device;
 acquiring photographing data related to video in the photographing range that is changed in the space;
 causing a display unit of the virtual terminal device to display video related to the photographing data;
 setting a photographing mode of the virtual terminal device to a photographing mode of a front camera for photographing the photographing range including an avatar of the user and an avatar of another user in a same space of the virtual reality in an image; and saving, based on a saving operation, the photographing data in the photographing range according to the photographing mode in a storage unit.

6. A non-transitory computer readable recording medium storing therein a computer program that, in response to execution by a computer, causes the computer to execute:

calculating a relative position between a terminal device and a display device that displays virtual reality to be used by a user;

causing a virtual terminal device to display in accordance with a control signal from the terminal device in a space of the virtual reality;

based on the relative position, changing a photographing range displayed on the virtual terminal device in the space of the virtual reality displayed on the display device;

acquiring photographing data related to video in the photographing range that is changed in the space;

causing a display unit of the virtual terminal device to display video related to the photographing data;

setting a photographing mode of the virtual terminal device to a photographing mode of a front camera for photographing the photographing range including an avatar of the user and an avatar of another user in a same space of the virtual reality in an image; and saving, based on a saving operation, the photographing data in the photographing range according to the photographing mode in a storage unit.

\* \* \* \* \*